Aug. 26, 1930. F. L. WILLRODT Re. 17,780

STEERING ATTACHMENT FOR TRACTORS

Original Filed June 30, 1926 4 Sheets-Sheet 1

Inventor

Fred L. Willrodt

By

Hiram A. Sturges

Attorney

Aug. 26, 1930. F. L. WILLRODT Re. 17,780

STEERING ATTACHMENT FOR TRACTORS

Original Filed June 30, 1926 4 Sheets-Sheet 2

Inventor

Fred L. Willrodt

By

Hiram A. Sturges Attorney

Aug. 26, 1930. F. L. WILLRODT Re. 17,780

STEERING ATTACHMENT FOR TRACTORS

Original Filed June 30, 1926 4 Sheets-Sheet 3

Inventor

Fred L. Willrodt

By

Hiram A. Sturges Attorney

Aug. 26, 1930. F. L. WILLRODT Re. 17,780
STEERING ATTACHMENT FOR TRACTORS
Original Filed June 30, 1926 4 Sheets-Sheet 4
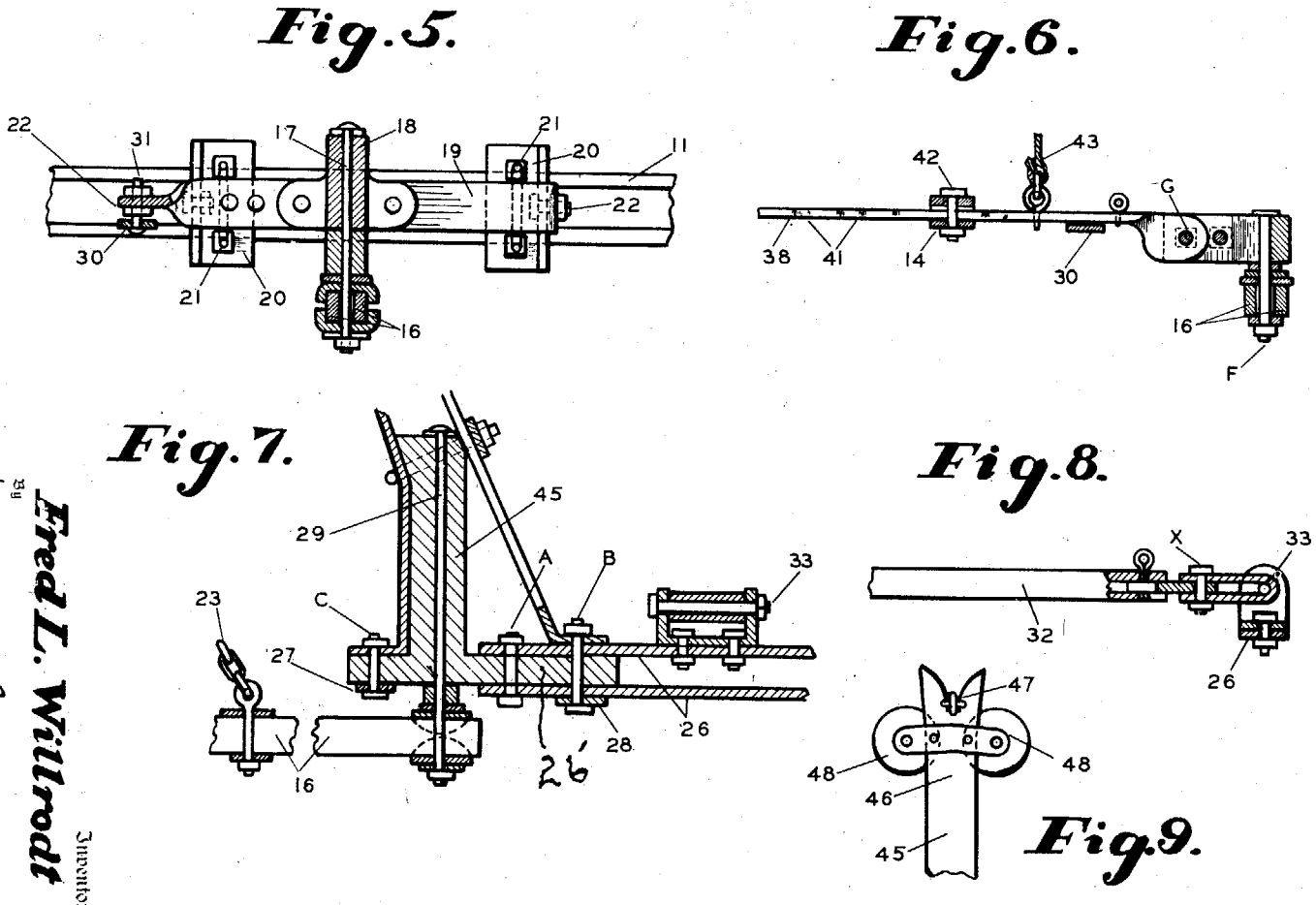
Inventor
Fred L. Willrodt
By
Hiram A. Sturges Attorney Reissued Aug. 26, 1930

Re. 17,780

UNITED STATES PATENT OFFICE

FRED L. WILLRODT, OF OMAHA, NEBRASKA

STEERING ATTACHMENT FOR TRACTORS

Original No. 1,639,246, dated August 16, 1927, Serial No. 119,656, filed June 30, 1926. Reissue No. 17,543, dated December 31, 1929, Serial No. 385,986, filed August 15, 1929. This application for reissue filed May 31, 1930. Serial No. 458,767.

This invention relates to a steering attachment for tractors, of the class adapted to accomplish steering a tractor when plowing and listing by use of a guide adapted to travel in a furrow.

One of the objects of the invention is to provide a shoe for the attachment at the front of the tractor which will be automatically maintained parallel with the line of traction so that the supporting-bar for the guide will be maintained approximately at right-angles to the furrow.

Another object is to provide a steering attachment of such construction that the tractor may travel at selected distances from the furrow, the distance of the shoe from the furrow not being changed.

Still another object is to provide a standard for the steering attachment for use when supporting the guides when "turning about" at the end of a field or when moving the guides to the right or left side of the line of traction.

Still another object is to provide an attachment of the class described which will resist side stresses directed thereto while cultivating ground which is inclined transversely to the line of travel.

The invention includes a steering attachment adapted to be used for listing and general cultivation of the ground as well as for plowing.

With the foregoing objects in view and others to be mentioned hereinafter, the invention presents a new and useful construction, combination and arrangement of parts as described and claimed and as illustrated in the accompanying drawings, it being understood that changes may be made in form, size, proportion of parts and minor details, said changes being within the scope of the invention as claimed.

Figure 1:
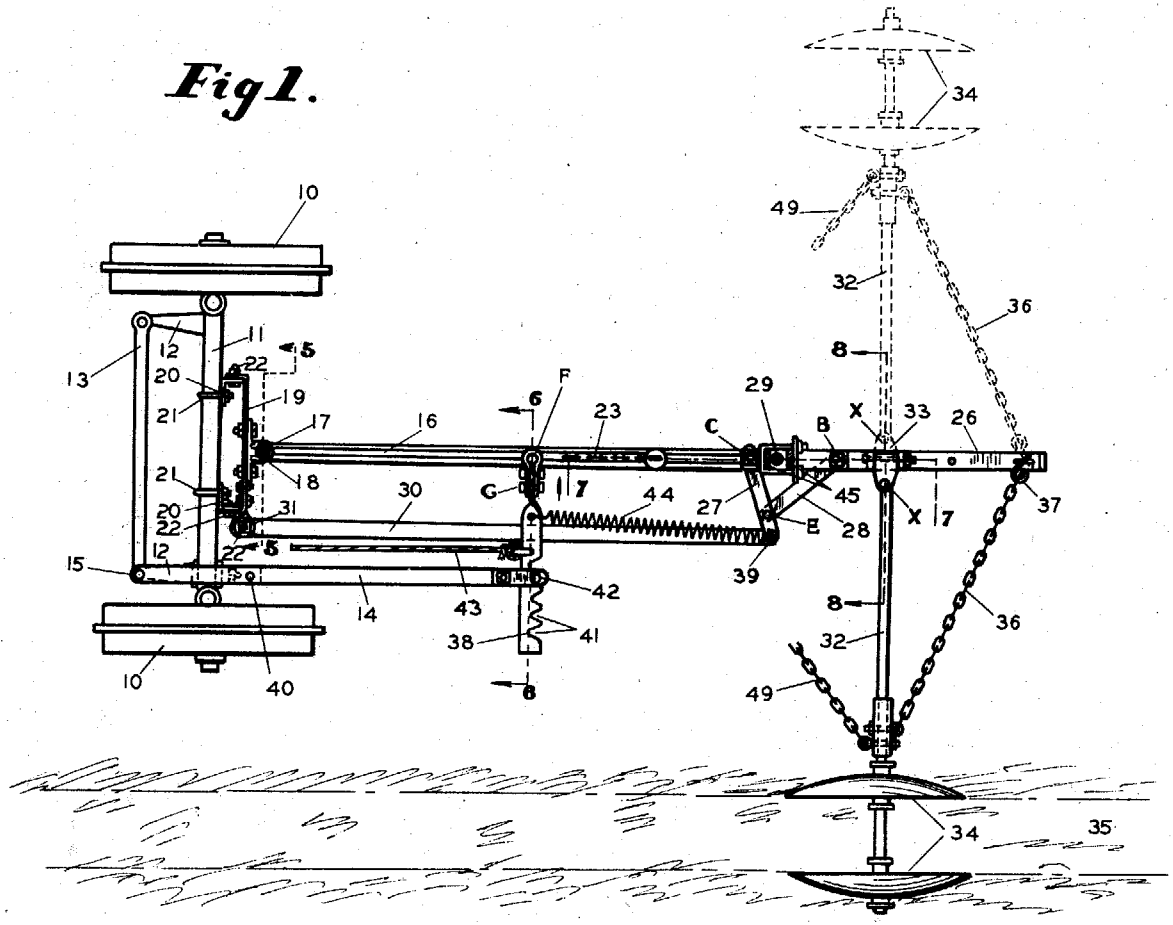
Figure 2:
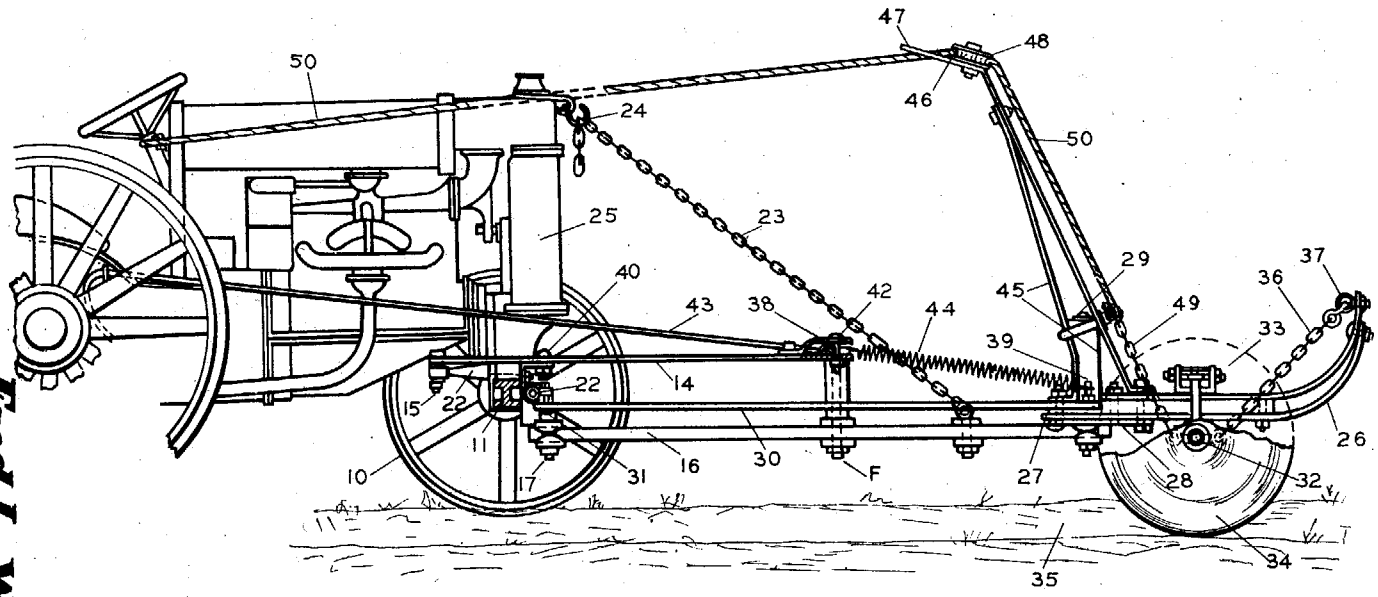
Figures 3, 4:
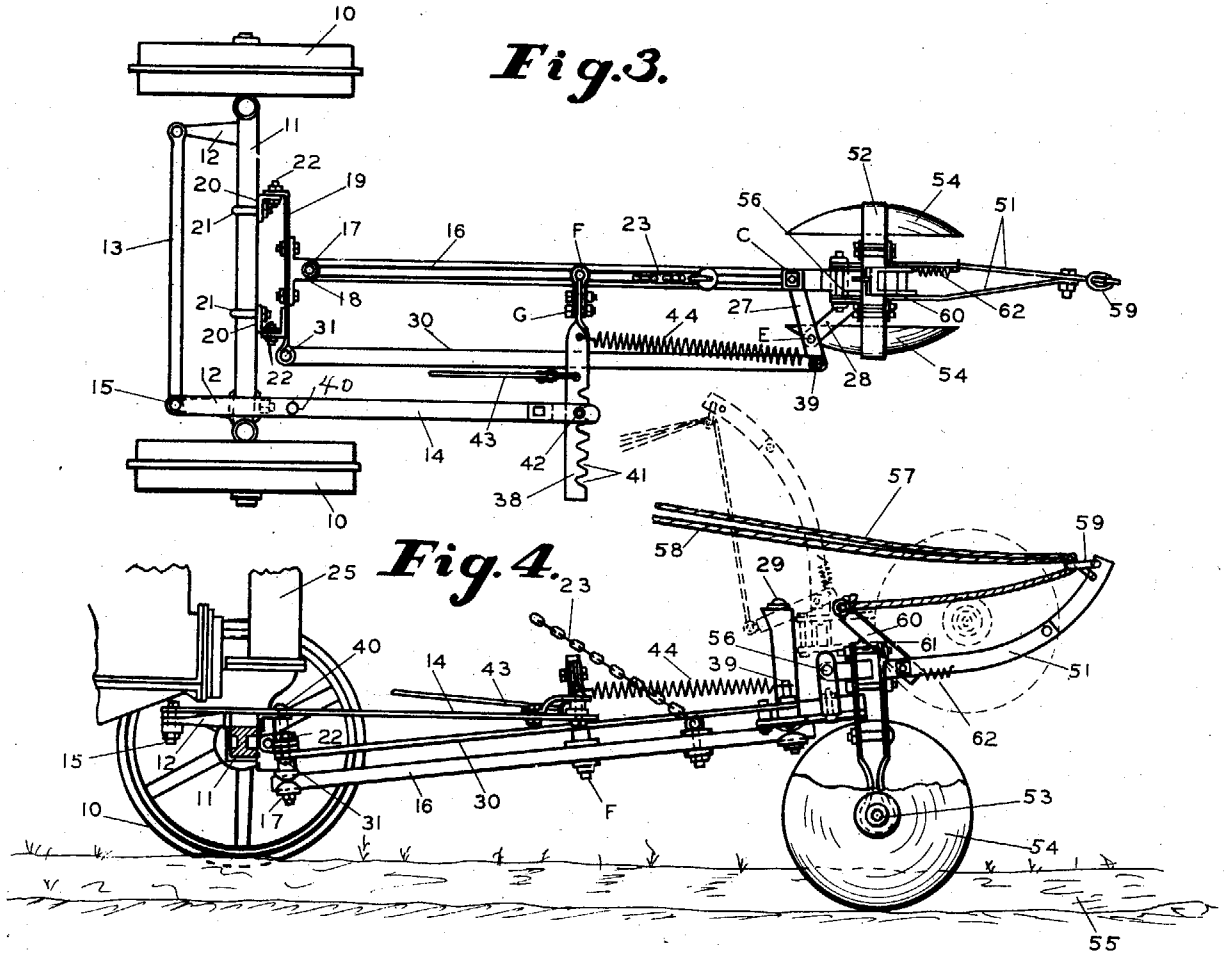

In the drawings, Fig. 1 is a plan view partly broken away, of the steering attachment secured to the front part of a tractor. Fig. 2 is a view of the attachment in side elevation, a part of a tractor, in section, being shown. Fig. 3 is a plan view of the attachment arranged for listing. Fig. 4 is a side view of the parts shown in Fig. 3. Figs. 5, 6, 7, 8 and 9 are enlarged details. Fig. 5 is a sectional view on line 5—5 of Fig. 1. Fig. 6 is a sectional view on line 6—6 of Fig. 1. Fig. 7 is a sectional view on line 7—7 of Fig. 1. Fig. 8 is a sectional view on line 8—8 of Fig. 1. Fig. 9 is a plan view of a chain-holder for the standard of the steering attachment.

Referring now to the drawings for a more particular description, the invention is shown and described in connection with the front wheels 10, axle 11, the spindle-bars 12 and the coupling-rod 13 which connects the two spindle-bars one with the other, these being well known parts hereinafter called the steering mechanism of the tractor.

Numeral 14 indicates a steering-arm which extends forwardly of the tractor for use with other parts to be described. It may have any suitable connection with the steering mechanism of the tractor, the connection shown herein being a bolt 15 (Fig. 1) which pivotally connects the rear end of said arm 14 with the coupling-rod 13.

I provide a carrier-beam 16 which extends forwardly from the tractor, and provide a coupling structure for connecting the rear end of said carrier with the front axle 11, said coupling structure being of such arrangement that the carrier-beam may have swinging movements horizontally and vertically relative to the axle. While any suitable means may be provided to permit these movements, the coupling structure preferably consists of a vertical pivot or bolt 17 (Figs. 1, 5) which is mounted in a vertical socket 18 which is secured to a horizontal supporting-plate 19. Brackets 20 are secured to the axle 11 by means of a pair of U-bolts 21. The plate 19 is of angular form and, as clearly shown in Fig. 1, is bent to provide end-portions disposed at right-angles to the body of said plate, and by means of horizontal bolts 22 which engage in said brackets and end-portions of the plate 19, said plate will be mounted to permit movements of the carrier-beam in vertical planes, the mounting of the vertical bolts 17 permitting the carrier-beam to swing in horizontal planes.

As best shown in Fig. 2 of the drawings, the carrier-beam is adapted to be supported and held at a suitable distance above the ground by a flexure member or chain 23, the rear end of the chain being adjustably mounted on a hook 24 which is secured to the upper part of the radiator 25, the lower end of the chain being suitably secured to the carrier-beam near the front end thereof.

Numeral 26 indicates a shoe which is provided at its rear end with a base support 26′, said support and shoe being rigidly connected by means of bolts A and B (Fig. 5). Numeral 27 indicates a lateral supporting means or fulcrum-bar. It is rigidly secured to the base support 26′ by means of keepers or bolts B and C, the bolt B operating to secure one end of a brace-bar 28 to the support 26′. By means of a bolt E the outer end of the brace 28 is secured to the bar 27.

As thus described, the bars 27 and 28 together with the support 26′ provide a structure approximately triangular in plan, and at the time of manufacture they may, together with the shoe 26, be formed as an integral structure. Also, the brace-bar 28 may be dispensed with, if desired, since the fulcrum-bar 27 must have a rigid mounting upon the support.

Numeral 29 indicates a bolt or pivot-pin which is secured to and projects above the forward end of the carrier-beam 16 and which provides a pivotal mounting for the support 26′ together with the shoe 26 and fulcrum-bar 27, said bolt or pivot 29 being disposed between the shoe 26 and lateral supporting means or fulcrum-bar 27 so that the latter may discharge its functions to be described. Since the shoe can have no swinging movement independently of the support 26′ these two elements may be considered identical for many purposes.

Numeral 30 indicates an equalizing bar and, as best shown in Figs. 1 and 5 of the drawings its rear end is pivotally mounted by means of a pin 31 upon an extension of the supporting-plate 19 and therefore this bar 30 and carrier-bar 16 may have both vertical and horizontal movements, the centers of their arcs of movement being the pivotal mountings of their respective rear ends.

It will be noted that the distance between the pivots 17 and 31 is approximately equal to the length of the bar 27, and therefore when the carrier-beam is swung either to the right or left of the line of traction said members 16 and 30 will remain parallel with each other. Also it will be noted that during the horizontal movements of these bars they may move toward each other or the reverse.

Numeral 32 indicates a guide means or supporting-bar hingeably mounted as indicated at 35 upon the shoe 26, and upon the outer end of said pivoted guide means or bar 32 is journalled a pair of discs 34 adapted to travel in a furrow 35. At X is indicated a vertical pivot which is provided for securing the inner end of the bar 32 to the hinge 33, and therefore said bar may have horizontal swinging movements relative to the shoe, and since the pivot for the hinge is disposed at right-angles to the pivot X, the bar or guide means 32 may have swinging movements in vertical planes.

Numeral 36 indicates a brace or flexible member or chain which is secured at its outer end to the bar 32, its inner end being mounted on a hook 37, and it will be understood that the chain 36 may be adjusted longitudinally.

Numeral 38 indicates a controlling element or control-bar (Figs. 1. 6), said bar being adapted to have swinging movements in horizontal planes from the carrier-beam 16 since it is mounted thereon by means of a vertical pivot F, and on account of the horizontal pivotal mounting G of said bar it may have swinging movements in vertical planes relative to said carrier-beam.

This member 36 is for the purpose of resisting stresses directed to the guide member 34 during operation while the tractor is moving forwardly so that the bar 32 will be disposed approximately at right-angles to the shoe 26. While I have shown and described a chain 36 for the uses mentioned it is obvious that a metallic bar or rod could be substituted therefor and operation would be practically the same.

In operation, no attention of a driver is needed for the tractor except when "turning about" at the end of a field. If the furrow 35 leads in a straight line the line of traction will correspond thereto and the carrier-beam will have no horizontal swinging movement. However, if the furrow has a curvature the carrier-beam 16 will have a horizontal swinging movement and this movement will be communicated to the steering-arm 14 on account of the action of the control-bar 38 which is pivotally connected at its respective ends with said beam 16 and arm 14.

For instance, if the furrow 35 has a curvature to the "right" of the direction of travel of the tractor it is obvious that the beam 16 will swing horizontally toward the "off" side, and the control-bar 38 will be moved longitudinally in the same direction to cause an outward swinging movement of the front end of the steering arm 14, and this last named movement will cause the tractor to move on a line conforming to the curvature of the furrow. Also it will be noted that regardless of the degree of curvature of a furrow the shoe will be maintained parallel with the line of traction, and this feature is of great advantage.

While the tractor is moving forwardly the guide-member 34 will normally remain in the furrow. The supporting-bar 32 will normally be disposed at right-angles to the furrow.

The bar 27 of the shoe is pivotally mounted, as indicated at 39 upon the front end of the equalizing-bar 30 which operates as a fulcrum, and any horizontal swinging movement of the shoe will be coincidently communicated to the steering-arm 14 and to the steering mechanism of the tractor.

In operation, the carrier-beam 16 and equalizing-bar 30 may be disposed in angular relation to the line of traction, but according to the present construction, the shoe will at all times be maintained parallel with the line of traction, and this feature is of great advantage since the supporting-bar 32 during operation, will be disposed approximately at right-angles to the furrow 35 so that there will be no tendency for the guide-member to leave the furrow while the tractor is moving.

The control-bar 38 operates to advantage for many purposes as will be seen. When operating in rough ground, either plowing or listing, this bar tends to resist side stresses directed to the shoe, the equalizing-bar and carrier-beam, for the reason that it is mounted on the steering-arm, and since the latter is pivotally mounted between its ends as indicated at 40, stresses directed to either side of these parts will be resisted.

In operation, it is often desirable to have the tractor move very close to the furrow 35 especially if the ground to be plowed or listed is inclined transversely to the line of traction, and the invention includes such a mounting of the steering-arm that this may be accomplished. By referring to Fig. 1 of the drawings it will be seen that the carrier-beam 16, equalizing-bar 30 and steering-arm 14 are disposed approximately parallel with the line of traction and that the control-bar 38 is provided with notches 41. The steering-arm, at its end, is provided with a downwardly projecting pin 42 adapted to engage in any selected notch 41, and to accomplish this adjustment, a pull-rope 43 is provided. By use of the pull-rope the bar 38 may be swung rearwardly against the force of a spring 44 so that the pin or projection 42 may engage in any selected notch of said bar 38.

When it is desired that the tractor shall move with its "off" wheel close to the furrow the pin 42 is disposed in a notch nearer to the free end of the bar 38, the result being that the steering mechanism of the tractor will be changed to cause the tractor, during its movements, to be disposed closely adjacent to the furrow 35, and during the forward travel of the tractor the carrier-beam 16 and equalizing-bar 30 will remain parallel with reference to each other but they will swing and will be inclined toward the "near" side of the line of traction, that is to say, the tractor and rear ends of members 16 and 30 will be disposed closer to the furrow than before and the front ends of said members 16 and 30 will be disposed the same distance from the furrow as before.

The adjustments just described for the steering-arm 14 proves to be of importance since tractors are now in general use for plowing and listing ground on hillsides and in valleys and rough and undulating ground, and in such instances these adjustments are always made to cause the tractor to travel at a selected distance from the furrow.

It will be noted that when an adjustment has been made as last described the shoe 26 will be disposed parallel with the line of traction, this feature being of importance so that the brace-member or chain 36, in connection with said shoe will maintain the supporting-bar 32 approximately at right-angles to the line of traction.

It will be seen that the function discharged by the spring 44 is to cause a constant pressure of the control-bar 38 so that it will be pressed forwardly against the pin or projection 42 of the steering-arm. This is simply a matter of convenience and I may dispense with this spring 44 and notches 41, if desired, and provide other equivalent means. While I prefer the construction as shown and described I do not wish to be understood as limiting myself in this respect. Also while I have shown the mounting of the rear end of the equalizing-bar 30 to be near the axle upon the supporting-plate 19 and prefer this construction, it is obvious that this equalizing-bar is for the purpose of providing a fulcrum which will pivotally support the end of the arm 27, and I may substitute other means to operate as a fulcrum. Also I may dispense with the use of the bar 28 since it operates simply as a brace to reinforce the arm 27.

When "turning about" at the end of a field or when driving upon a highway, the guide or discs 34 must be removed from the furrow, and therefore I provide means for elevating it and for maintaining it in its elevated position. For these purposes I provide a standard 45 which projects upwardly from the rear end of the shoe and is secured thereto. This standard may be of any suitable construction and may have any suitable height, and as best shown in Fig. 2 of the drawings it, preferably, has a rearward inclination so that it will not be obtrusive when the supporting-bar 32 and its discs 34 have been swung upwardly.

Upon the top of the standard is an inclined head-piece or plate 46 provided with a V-shaped notch 47, and upon the plate 46 is mounted a pair of rollers or pulleys 48. I provide a chain 49 which is secured at one of its ends to the supporting-bar, the opposite end of said chain being provided, preferably, with a rope or cable 50, and an operator, by use of the rope, may cause the supporting-bar and discs to swing upwardly, the chain moving between the pulleys 48, and one of the links of the chain being caught in the V-shaped notch 47, which operates to maintain the supporting-bar 32 and discs in the elevated position mentioned. To release the chain from the notch, an operator shakes the rope in a well known manner to cause the chain to spring upwardly from the V-shaped notch and permits the supporting-bar 32 together with its discs to swing downwardly. While I have shown and described a pair of pulleys 48, they are simply for the purpose of controlling the direction of movement of the chain 49 so that one of the links of the chain will become caught suitably in the notch 47. The use of this notch is important in operation but its shape and proportions may be changed in a manner to dispense with the use of the pulleys mentioned.

Since the present invention includes such a mounting for the supporting-bar 32 and guide-member 34 that said bar may be swung in a circle's arc of 180 degrees for operation at either side of the line of traction the requirement of the standard 45 or an equivalent support for a chain 49 is obvious for successful, convenient operation. According to the present construction, an operator, at a remote distance from and rearwardly of the attachment, by use of the rope 50, may cause the supporting-bar 32 to swing a complete half-circle, and since the standard has an upward and rearward inclination said bar and discs 34 will not move into engagement therewith during their swinging movements.

In the modified form of the invention illustrated in Figs. 3 and 4 of the drawings, all of the parts remain the same as have been described except that the shoe 26 together with the supporting-bar 32 with its discs 34 and the chains 32 and 49 are omitted and a shoe 51 is substituted and is mounted to permit horizontal swinging movements on the vertical bolt or pivot-pin 29 already described, said shoe 51 being provided with a yoke 52 to provide bearings for the shaft 53 of a pair of discs 54, said discs operating as a guide-member and adapted to travel in a furrow 55.

The herein described steering attachment for tractors shown in Figs. 3 and 4 of the drawings is used for listing, and it will be understood that a lister (not shown) may be attached to the tractor, rearwardly thereof, and used for cultivating the ground generally or may be used for listing two or more rows of corn, the operation being that furrows will be formed between the rows of corn, and the furrow 55 may be considered as a furrow formed by a lister; and it should be stated that all of the parts heretofore described for steering the tractor, are depended upon during the operation of listing as well as for plowing. In operation, if the furrow 55 has a longitudinal curvature, the guide-member or discs 54 which travel therein will cause a lateral swinging movement of the shoe 51 which will cause a like swinging movement of the carrier-beam 16, and equalizing-bar 30 as well as the steering-arm 14 for steering the tractor, and the shoe 51 will always remain parallel with the line of traction.

When "turning about" at the end of a field the shoe 51 may be swung upwardly as shown in dotted lines in Fig. 4 of the drawings, the shoe being adapted to have swinging movements upwardly and downwardly on its pivotal mounting 56, a cable or rope 57 being secured to a ring at the front end of the shoe so that an operator on the tractor may control the swinging movements mentioned. However, means should be provided for maintaining the shoe in its uppermost position when swung upwardly. I provide a second cable or rope 58 which extends through the ring 59 and is secured at its end to a U-shaped latch 60 which is pivotally mounted on the shoe, and when the shoe is swung downwardly for engagement of its disc in the furrow, the latch is adapted to become caught upon a projection 61 which is mounted on the yoke and which operates as a catch, a spring 62 being employed and having a connection with the shoe and said latch 60 and which normally presses said latch toward its engaging position with said projection 61. During operation, the guide-member 54 may be lifted from the furrow by use of the pull ropes, the latch 60 moving from its locked position with the projection or catch 61 against the force of the spring 62, and the parts are of such proportions that when the shoe and discs have moved to their uppermost position the latch 60 will become caught on the bolt 29, and the parts will remain in this last named position.

I claim as my invention,—

1. A steering attachment for tractors comprising a carrier extended forwardly of the tractor, a coupling structure between the rear end of said carrier and the front axle of the tractor and including a vertical and a horizontal pivot, a support secured to the forward end of the carrier, a pivoted guide means connected with said support and adapted to travel in a furrow to guide the tractor, a steering arm operated from the steering mechanism of the tractor and projecting forwardly therefrom, and a spring controlled controlling element for said arm, said element detachably connecting said arm with the carrier.

2. A steering attachment for tractors comprising a carrier extended forwardly of the tractor, a coupling structure between the rear end of said carrier and the front axle of the tractor and including a vertical and a horizontal pivot, a support secured to the forward end of the carrier, a pivoted guide means connected with said support and adapted to travel in a furrow to guide the tractor, a steering arm operated from the steering mechanism of the tractor and projecting forwardly therefrom, a spring controlled controlling element for said arm, said element detachably connecting said arm with the carrier, a lateral supporting means fixed to said support, and an equalizing bar having its forward end pivoted to said lateral supporting means and its rear end pivoted to said coupling structure.

3. A steering attachment for tractors comprising a carrier extended forwardly from the tractor, a coupling structure between the rear end of the carrier and the front axle of the tractor and providing means for pivotally connecting the carrier with the front axle of the tractor, a support secured with the forward end of the carrier, a pivoted guide means arranged forwardly of and connected with said support and adapted to travel in a furrow for guiding the tractor, a steering arm extended over the front axle of the tractor and adapted to have its rear end pivotally connected with the steering mechanism of the tractor for operation thereby, and a spring controlled toothed controlling element for said arm, said element pivotally connected to and extending at right angles with respect to the carrier and said arm provided with means selectively engaging with the teeth of said element for detachably connecting said arm with the carrier and to provide for the horizontal adjustment of the latter.

4. A steering attachment for tractors comprising a carrier extended forwardly from the tractor, a coupling structure between the rear end of the carrier and the front axle of the tractor and providing means for pivotally connecting the carrier with the front axle of the tractor, a support secured with the forward end of the carrier, a pivoted guide means arranged forwardly of and connected with said support and adapted to travel in a furrow for guiding the tractor, a steering arm extended over the front axle of the tractor and adapted to have its rear end pivotally connected with the steering mechanism of the tractor for operation thereby, a controlling element for said arm, said element pivotally connected to and extending at right angles with respect to the carrier and providing means for detachably connecting said arm with the carrier, a lateral supporting means fixed to said support, and an equalizing bar pivotally connected at its forward end to the outer end of said lateral supporting means and further pivotally connected at its rear end with said coupling structure adjacent the point of connection of the carrier with said coupling structure.

5. A steering attachment for tractors comprising a carrier extended forwardly from the front of the tractor and in the form of a beam, tractor guide means supported from the forward end of the carrier on a vertical pivot, a coupling structure between the rear end of the carrier and the front axle of the tractor including a horizontal and a vertical pivot for the carrier, a combined steering and adjusting means for the carrier connected to the steering mechanism of the tractor, said guide means bodily movable with the carrier when the latter is adjusted, a lateral support arranged at the forward end of the carrier, and an equalizing bar having its forward end pivotally connected to said lateral support and its rear end pivotally connected to said coupling structure.

6. A steering attachment for tractors comprising a carrier extended forwardly from the front of the tractor and in the form of a beam, an upwardly shiftable tractor guide means supported from the forward end of the carrier on a vertical pivot, means for pivotally connecting the rear end of the carrier with the front axle of the tractor of the vehicle, a combined steering and adjusting means for the carrier operated from the steering mechanism of the tractor, said guide means bodily shiftable with the carrier when the latter is adjusted, a lateral support arranged at the forward end of the carrier, and an equalizing bar having its forward end pivotally connected to said support and its rear end pivotally connected with means for pivotally connecting the carrier to the front axle of the vehicle.

7. A steering attachment for tractors comprising a carrier extended forwardly from the tractor and in the form of a beam, a support in the form of a base and a standard connected with the forward end of the carrier, a steering arm connected to and operated by the steering mechanism of the tractor and further connected with the carrier, means for pivotally connecting the rear end of the carrier with the front axle of the tractor, said steering arm connected with the carrier forwardly of said pivot means, a shoe connected to said base and extended forwardly therefrom, a bar disposed laterally with respect to said shoe and having its inner end pivotally supported upon the shoe, a pair of spaced revoluble tractor guide members mounted on the outer portion of said bar, and means connected to said bar and standard for selectively positioning the guide members at either side of the line of draft of the tractor.

8. A steering attachment for tractors comprising a carrier extended forwardly from the tractor and in the form of a beam, a support in the form of a base and a standard connected with the forward end of the carrier, a steering arm connected to and operated by the steering mechanism of the tractor and further connected with the carrier, means for pivotally connecting the rear end of the carrier with the front axle of the tractor, a shoe connected to said base and extended forwardly therefrom, a bar disposed laterally with respect to said shoe and having its inner end pivotally supported upon the shoe, a pair of spaced revoluble tractor guide members mounted on the outer portion of said bar, an elevating and lowering member for said guide members and providing for selectively positioning the guide members at either side of the line of draft of the tractor, a guide device for said elevating and lowering member, said guide device arranged above said support and a guide device carrier secured to the support, extended upwardly therefrom and having said guide device secured to and supported on the upper end thereof.

9. A steering attachment for tractors comprising a carrier extended forwardly from the tractor and in the form of a beam, a support in the form of a base and a standard connected with the forward end of the carrier, a steering arm connected to and operated by the steering mechanism of the tractor and further connected with the carrier, means for pivotally connecting the rear end of the carrier with the front axle of the tractor, a shoe connected to said base and extended forwardly therefrom, a bar disposed laterally with respect to said shoe and having its inner end pivotally supported upon the shoe, a pair of spaced revoluble tractor guide members mounted on the outer portion of said bar, an elevating and lowering member for said guide members and providing for selectively positioning the guide members at either side of the line of draft of the tractor, a guide device for said elevating and lowering member, said guide device arranged above said support, a guide device carrier secured to the support, extended upwardly therefrom and having said guide device secured to and supported on the upper end thereof, and means carried by said guide device and engaging in said elevating and lowering member for maintaining the guide members in an elevated position.

10. A steering attachment for tractors comprising a shiftable carrier projected forwardly from the front of the tractor, means for pivotally connecting the rear end of the carrier to the front of the front axle of the tractor, a tractor guide means for traveling in a furrow to guide the tractor, a coupling structure between said guide means and the carrier and including pivots extending at right angles with respect to each other, a steering arm connected to and operated from the steering mechanism of the tractor and adjustably connected with the carrier and providing means for shifting the latter, means for elevating the carrier, and means for positioning the guide means at each side of the line of draft of the tractor.

11. A steering attachment for tractors comprising a shiftable carrier projected forwardly from the front of the tractor, means for pivotally connecting the rear end of the carrier to the front of the front axle of the tractor, a tractor guide means for traveling in a furrow to guide the tractor, a coupling structure between said guide means and the carrier and including pivots extending at right angles with respect to each other, a steering arm connected to and operated from the steering mechanism of the tractor and adjustably connected with the carrier and providing means for shifting the latter, means for elevating the carrier, means for positioning the guide means at each side of the line of draft of the tractor, a lateral support extended from the forward portion of the carrier, and an equalizing bar having its forward end pivotally connected to the outer end of said lateral support and its rear end pivotally connected with the means for pivotally connecting the carrier with the front axle of the tractor.

12. A steering attachment for tractors comprising a carrier extended forwardly from the tractor and in the form of a beam, a support in the form of a base and a standard connected with the forward end of the carrier, a guide device, means secured to said support for supporting said guide device in an elevated position with respect to the carrier, tractor guide means travelling in a furrow for guiding the tractor, means for connecting said tractor guide means with said base and including a pair of pivots disposed at right angles with respect to each other, elevating and lowering means for said tractor guide means and traveling through said guide device and further providing for the positioning of the tractor guide means at each side of the line of draft of the tractor, a steering element connected to and operated from the steering mechanism of the tractor, and a spring controlled means connected with said carrier, intermediate the ends of the latter, and adjustably connected to said steering element.

13. A steering attachment for tractors comprising a carrier extended forwardly from the tractor and in the form of a beam, a support in the form of a base and a standard connected with the forward end of the carrier, a guide device, means secured to said support for supporting said guide device in an elevated position with respect to the carrier, tractor guide means traveling in a furrow for guiding the tractor, means for connecting said tractor guide means with said base and including a pair of pivots disposed at right angles with respect to each other, elevating and lowering means for said tractor guide means and traveling through said guide device and further providing for the positioning of the tractor guide means at each side of the line of draft of the tractor, a steering element connected to and operated from the steering mechanism of the tractor and adjustably connected with said carrier intermediate the ends of the latter, said steering element including a controlling spring, a fixed lateral support extending laterally from said base and carrier, and an equalizing bar pivotally connected at its forward end to the outer end of said fixed lateral support and having its rear end pivotally connected with the means for pivotally connecting the carrier to the front axle of the tractor.

14. A steering attachment for tractors comprising a carrier extended forwardly from the tractor and in the form of a beam, means for pivotally connecting the rear end of the carrier to the front axle of the tractor, tractor guide means connected with the forward end of the carrier and traveling in a furrow for guiding the tractor, a steering arm for the carrier, said arm connected to and operated from the steering mechanism of the tractor, and a spring controlled adjusting connection between the forward end of said arm and said carrier intermediate the ends of the latter.

15. A steering attachment for tractors comprising a carrier extended forwardly from the tractor in the form of a beam, means for pivotally connecting the rear end of the carrier to the front axle of the tractor, tractor guide means connected with the forward end of the carrier and traveling in a furrow for guiding the tractor, a steering arm for the carrier, said arm connected to and operated from the steering mechanism of a tractor, a spring-controlled adjusting connection between the forward end of said arm and said carrier intermediate the ends of the latter, means for elevating said tractor guide means, and said element and arm having coacting means for horizontally adjusting the carrier and for retaining it in its adjusted positions.

16. A steering attachment for tractors comprising a carrier extended forwardly from the tractor and in the form of a beam, means for pivotally connecting the rear end of the carrier to the front axle of the tractor, tractor guide means connected with the forward end of the carrier and traveling in a furrow for guiding the tractor, a steering arm for the carrier, said arm connected to and operated from the steering mechanism of the tractor, a spring controlled adjusting connection between the forward end of said arm and said carrier intermediate the ends of the latter, said tractor guide means including a vertical pivot and a pivot extending parallel to the line of draft of the tractor, said tractor guide means shifted on its vertical pivot by said carrier, and means for elevating said tractor guide means and further for positioning the same at each side of the line of draft of the tractor.

17. A steering attachment for tractors comprising a carrier extended forwardly from the tractor and in the form of a beam, means for pivotally connecting the rear end of the carrier to the front axle of the tractor, tractor guide means connected with the forward end of the carrier and traveling in a furrow for guiding the tractor, a steering arm for the carrier, said arm connected to and operated from the steering mechanism of the tractor, a spring controlled adjusting connection between the forward end of said arm and said carrier intermediate the ends of the latter, said tractor guide means including a vertical pivot and a pivot extending parallel to the line of draft of the tractor, said tractor guide means shifted on its vertical pivot by said carrier, means for elevating said tractor guide means and further for positioning the same at each side of the line of draft of the tractor, and said element and arm having coacting means for horizontally adjusting the carrier and for retaining it in its adjusted positions.

18. In a steering attachment for tractors, a carrier-beam provided with a shoe and mounted on the tractor to permit vertical and horizontal movements, a supporting-bar hingeably mounted on the shoe to permit vertical movements and pivotally mounted on said shoe to permit horizontal movements, a brace-member connected with the supporting-bar and mounted on the shoe, a guide member rotatably mounted on the supporting-bar and adapted to travel in a furrow and to move the carrier-beam, a steering-arm connected with the steering mechanism of the tractor, and a control-bar movable with the carrier-beam, detachably connected with said steering-arm for actuating said steering-arm and steering mechanism of said tractor.

19. In a steering attachment for tractors, a carrier-beam extending forwardly from and pivotally mounted on the tractor, an equalizing-bar disposed at the side of the carrier-beam and movable therewith, a shoe pivotally mounted on the carrier-beam and fulcrumed on the equalizing-bar, a supporting-bar mounted on the shoe, a guide member rotatably mounted on the supporting-bar and adapted to travel in a furrow and to move the supporting-bar, said shoe and carrier-beam, a steering-arm connected with the steering mechanism of the tractor, and a control-bar movable with the carrier-beam for moving said steering-arm for actuating the steering mechanism of said tractor.

20. In a steering attachment for tractors, a carrier-beam pivotally mounted on the tractor, a steering-arm connected with the steering mechanism of the tractor, a shoe pivotally mounted on the carrier-beam and provided with an arm, an equalizing-bar pivotally connected with the arm of said shoe and movable with the carrier-beam, a supporting-bar mounted on the shoe, a guide-member mounted on the supporting-bar and adapted to travel in a furrow and cause a movement of the supporting-bar, said shoe and said carrier-beam, and a control-bar movable with the carrier-beam for moving said steering-arm and steering mechanism of the tractor.

21. In a steering attachment for tractors, a carrier-beam and an equalizing-bar each mounted on the tractor to permit horizontal and vertical movements, a steering arm connected with the steering mechanism of the tractor, a shoe mounted on the carrier-beam to permit horizontal swinging movements therefrom and having an arm pivotally connected with the equalizing-bar, a supporting-bar hingeably mounted on the shoe, a guide-member rotatably mounted on the supporting-bar and adapted to travel in a furrow and cause movements of the supporting-bar, said shoe, said carrier-beam and equalizing-bar, and a control-bar movable by the carrier-beam for moving the steering-arm for moving the steering mechanism of the tractor.

22. In a steering attachment for tractors, a carrier-beam pivotally mounted on the tractor, a steering-arm connected with the steering mechanism of the tractor, a shoe mounted on the carrier-beam and provided with a standard, a supporting-bar hingeably mounted on the shoe, a guide-member mounted on the supporting-bar and adapted to travel in a furrow and to cause a movement of the supporting-bar, said shoe and carrier-beam, a chain arranged to engage the standard for removing the guide-member from the furrow, and a control-bar movable with the carrier-beam for actuating the steering-arm and steering mechanism of the tractor.

23. In a steering attachment for tractors, a carrier-beam extending forwardly from and pivotally connected with the tractor, a shoe having an arm and mounted on the carrier-beam, a standard mounted on the shoe and provided at its top with a V-shaped notch, a supporting-bar mounted to permit swinging movements from the shoe, a steering-arm connected with the steering mechanism of the tractor, a guide-member mounted on the supporting-arm and adapted to travel in a furrow and to cause movements of the supporting-bar, said control-bar movable with the carrier-beam for actuating the steering-arm and steering mechanism of the tractor, and a flexible member connected with the supporting-bar and adapted to be moved in the V-shaped notch for moving the guide-member from said furrow.

24. In a steering attachment for tractors, a carrier-beam and an equalizer-bar each pivotally mounted on and extended forwardly from the tractor, a shoe having an arm fulcrumed on the equalizing-bar, and pivotally mounted on the carrier-beam, a steering-arm connected with the steering mechanism of the tractor, a guide-member arranged to swing from the shoe for engaging in a furrow and adapted to move the shoe, said equalizing-bar and carrier-beam, a standard mounted on the shoe and provided with a V-shaped notch, a chain adapted to be moved in the notch of the standard for lifting a guide-member from the furrow, and a control-bar detachably connected with said steering-arm, and movable with the carrier-beam for moving said steering-arm.

25. In a steering attachment for tractors, a carrier-beam pivotally mounted on the tractor and extending forwardly therefrom, a steering-arm connected with the steering mechanism of the tractor, a shoe pivotally connected with the carrier-beam and provided with an arm, an equalizing-bar movable with the carrier-beam and pivotally connected with the arm of said shoe, a guide-member connected with the shoe and adapted to travel in a furrow and to cause movements of the shoe and said carrier-beam, and a control-bar detachably mounted on the steering-bar and movable with the carrier-beam for actuating said steering-bar and steering mechanism of the tractor.

26. In a steering attachment for tractors, a carrier-beam pivotally connected with the tractor, a steering-arm pivotally mounted between its ends and connected with the steering mechanism of the tractor, a shoe mounted on the carrier-beam, a guide-member mounted on the shoe to permit swinging movements therefrom in a vertical plane and adapted to travel in a furrow and cause movements of said shoe and carrier-beam, means for elevating the guide-member from the furrow, means for maintaining the guide-member in elevated position, and a control-bar connected with the steering-arm and moving with the carrier-beam for moving said steering-arm.

27. In a steering attachment for tractors, a carrier-beam pivotally connected with and extending forwardly from the tractor, a steering-arm having a projection and connected with the steering mechanism of the tractor, a shoe mounted on the carrier-beam, a guide-member mounted to permit swinging movements from the shoe and adapted to travel in a furrow and cause movements of the shoe and carrier-beam, a control-bar provided with notches and adapted to be disposed with one of its notches receiving the projection of the steering-arm, resilient means for pressing the control-bar against the projection of the steering-arm, said control-bar being movable with the carrier-beam for actuating said steering-arm.

28. In a steering attachment for tractors, a carrier-beam pivotally connected with the tractor, a shoe having a horizontal arm and pivotally connected with the carrier-beam, a guide-member connected with the shoe and adapted to travel in a furrow and to move said shoe and carrier-beam, an equalizing-bar pivotally mounted on the arm of said shoe and movable with the carrier-beam, a control-bar provided at longitudinal intervals with notches, a steering-arm connected with the steering mechanism of the tractor having a projection and adapted to be disposed with its projection engaging in a selected notch of the control-bar, and a resilient element tending to press the control-bar against the projection of the steering-arm, said control-bar being movable with the carrier-beam for actuating said steering-arm.

29. In a steering attachment for tractors, a carrier-beam mounted on and extending forwardly of the tractor, a shoe mounted on the carrier-beam, a supporting-bar mounted on the shoe to permit horizontal swinging movements, a guide-member mounted on the supporting-bar and adapted to travel in a furrow and to move the carrier-beam, a brace-member connected with the supporting-bar and mounted on the shoe, a steering-arm connected with the steering mechanism of the tractor, and a control-bar movable with the carrier-beam and detachably connected with the steering-arm for actuating said steering-arm and steering mechanism of the tractor.

In testimony whereof, I affix my signature.

FRED L. WILLRODT.